United States Patent [19]

Friedman

[11] Patent Number: 5,032,083

[45] Date of Patent: Jul. 16, 1991

[54] COMPUTERIZED VOCATIONAL TASK GUIDANCE SYSTEM

[75] Inventor: Mark B. Friedman, Pittsburgh, Pa.

[73] Assignee: Augmentech, Inc., Pittsburgh, Pa.

[21] Appl. No.: 447,991

[22] Filed: Dec. 8, 1989

[51] Int. Cl.$^5$ .............................................. G09B 21/00
[52] U.S. Cl. ........................................ 434/112; 434/1; 434/6; 434/312
[58] Field of Search ............................ 434/112, 362, 1

[56] References Cited

U.S. PATENT DOCUMENTS

| | | | |
|---|---|---|---|
| 4,660,022 | 4/1987 | Osaka | 342/24 |
| 4,827,395 | 5/1989 | Anders et al. | 364/138 |
| 4,935,907 | 6/1990 | Friedman | 367/118 |

Primary Examiner—V. Millin
Assistant Examiner—P. Kubel
Attorney, Agent, or Firm—Webb, Burden, Ziesenheim & Webb

[57] ABSTRACT

A system for training or aiding an impaired individual to perform a series of tasks at spaced work sites comprises a mobile device for being worn or carried by the individual. The mobile device comprises circuits and devices for detecting the position of the mobile device relative to the spaced work sites. It further comprises a programmed computer having a memory for storing a data structure associating each task with the ordinal number of the task, a task description, the site at which the task is to be performed, a flag or pointer indicative of whether a task has been performed and messages containing cues and/or instructions for each task. The programmed computer also comprises a memory and processor for storing and executing a program which based upon the task flag or pointer and the location of the mobile module for cueing and/or instructing the individual to perform a task at a site.

11 Claims, 5 Drawing Sheets

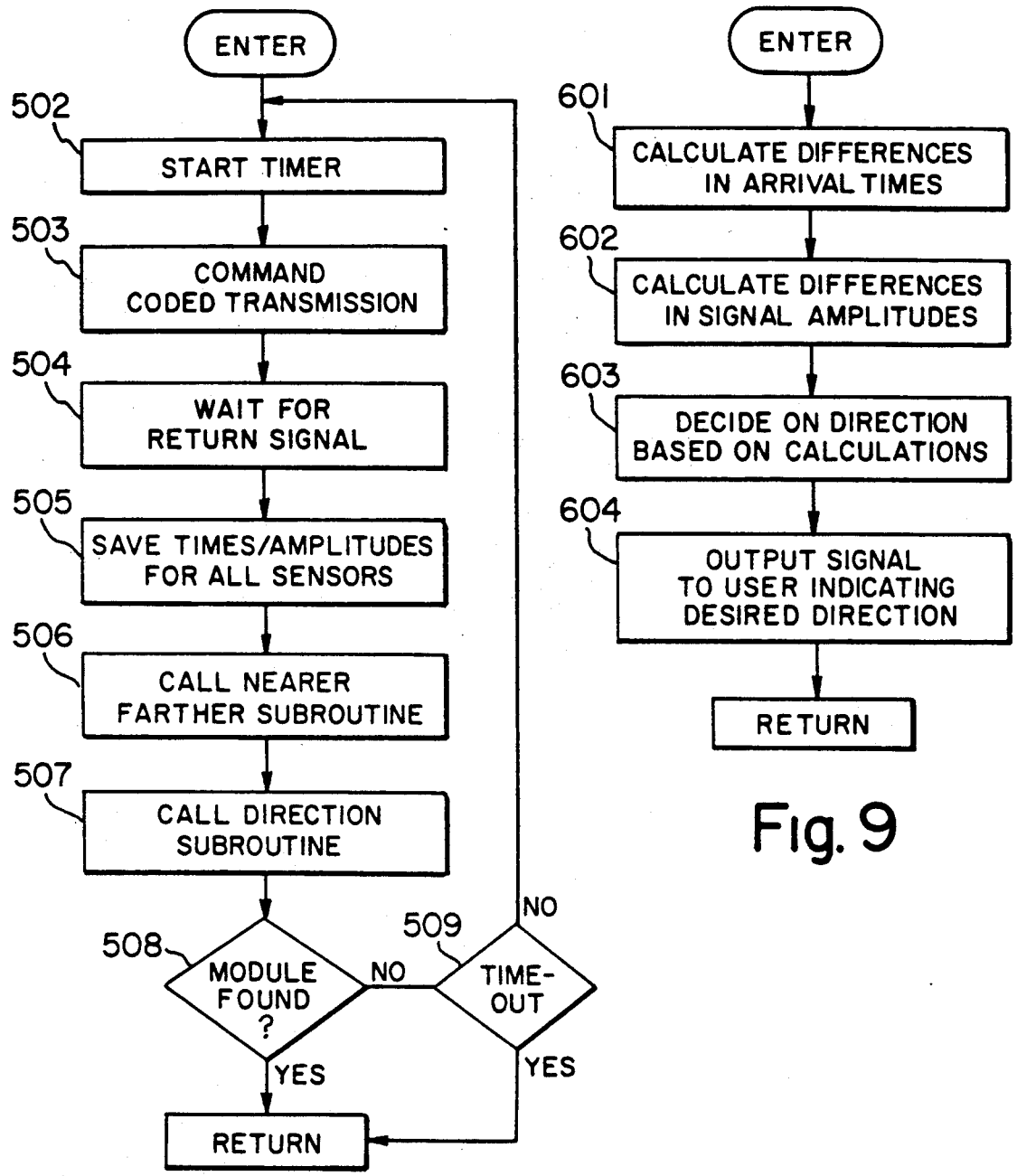

COMPUTERIZED VOCATIONAL TASK GUIDANCE SYSTEM

BACKGROUND OF THE INVENTION

One of the current trends in vocational rehabilitation is the job coach program. In this program, memory disabled individuals (for example, head injury patients) are placed on the job with a professional coach. The coach stays on the job as long as needed (often many months) until the patient learns enough skill to stay on the job with normal supervision. The justification for the job coach program is that it is less expensive than extensive pre-vocational and patient custodial treatment, especially since the patient and coach team is paid for the joint job. Of course, the coach is a professional trained in rehabilitation and must command a competitive wage for the professional service being performed. Hence, means of extending the reach of the coach to multiple patients is constantly being sought.

With some success, certain patients can be given less supervision by the combined use of an alarm watch and a notebook containing their daily schedule. A patient that can rely on this simple memory aid system is well along. There are many less fortunate patients. Typically, they do not associate the alarm signals with the need to scan their schedules in their notebooks. Also, they may have difficulty with selecting the appropriate written cue from a list of tasks. A number of supported employment programs involving private employers have used "walkman" type tape players to sequentially present vocal job instructions for patients with mild retardation or attentional deficits. This aid is most useful for a repetitive job such as clearing tables. Some attempts have been made to use personal computers dedicated to patients to direct them through a series of tasks. These cuing systems can provide timed, sequential, verbal or printed cues to the patient and may or may not include patient operated means to sense whether the cues have been heeded. In many cases, the patient cannot be relied upon to acknowledge all of the cues and, therefore, can easily be confused by cues or instructions that are given at the wrong time or in the wrong location.

Helping patients with memory, attention or perceptual impairments or a combination thereof to increase autonomy in the activities of daily living (ADL), either at home or in institutional settings, is every bit as important as helping similar patients to enter the work place. These individuals also can benefit from training aids that will not give cues or instructions at the wrong time or place.

SUMMARY OF THE INVENTION

It is an object, according to this invention, to provide a system for training or aiding memory or attention impaired individuals to perform a series of tasks at spaced locations.

It is a further object, according to this invention, to provide a means of providing spatially and temporally relevant cues and/or instructions to a memory impaired individual.

It is a still further object, according to this invention, to provide a means of monitoring the work performance of individuals to track progress, thus enabling the increase or decrease in the extent of the cuing, allowing the individual to progress at an optimum rate.

It is yet another object, according to this invention, to guide the individual from one job or activity site to the next while cuing and/or instructing the individual at each site.

Briefly, according to this invention, a system for training or aiding an impaired individual, for example, a trainee, to perform a series of tasks or activities at spaced locations comprises a mobile device for being worn or carried by the individual. The mobile device comprises a programmed microcomputer, a clock, and a system for automatically determining the location of the device relative to the sites at which tasks or activities are to be performed. The microcomputer memory has stored therein a task table or other data structure associating specific tasks to be performed by the individual with one or more of the following: the order, location, and times at which the tasks are to be performed, and cues and messages appropriate to each task. Preferably, a normal completion time for a given task and the normal transit time between task sites are also stored in the microcomputer memory. The computer is provided with tracking memory for recording that at least some of the tasks or movements between task sites have been completed by setting task completed flags and/or setting a pointer to the task or movement that has most recently been confirmed. The microcomputer is programmed to repeatedly read the clock, the location and the tracking memory and to execute an algorithm for, in the case the individual is in the correct task site, instructing or cuing him to perform the correct task at that site and, in the case the individual is not at the correct task site, instructing him to move to the next task site. Most preferably instructions guiding the individual to the new location are constantly updated as the individual moves from one task site to another.

BRIEF DESCRIPTION OF THE DRAWINGS

Further features and other objects and advantages will become apparent from the following detailed description made with reference to the drawings in which:

FIGS. 8 and 9 are flow diagrams describing software program subroutines for providing guidance to the trainee and determining direction respectively.

DESCRIPTION OF THE PREFERRED EMBODIMENTS

Figure 1:
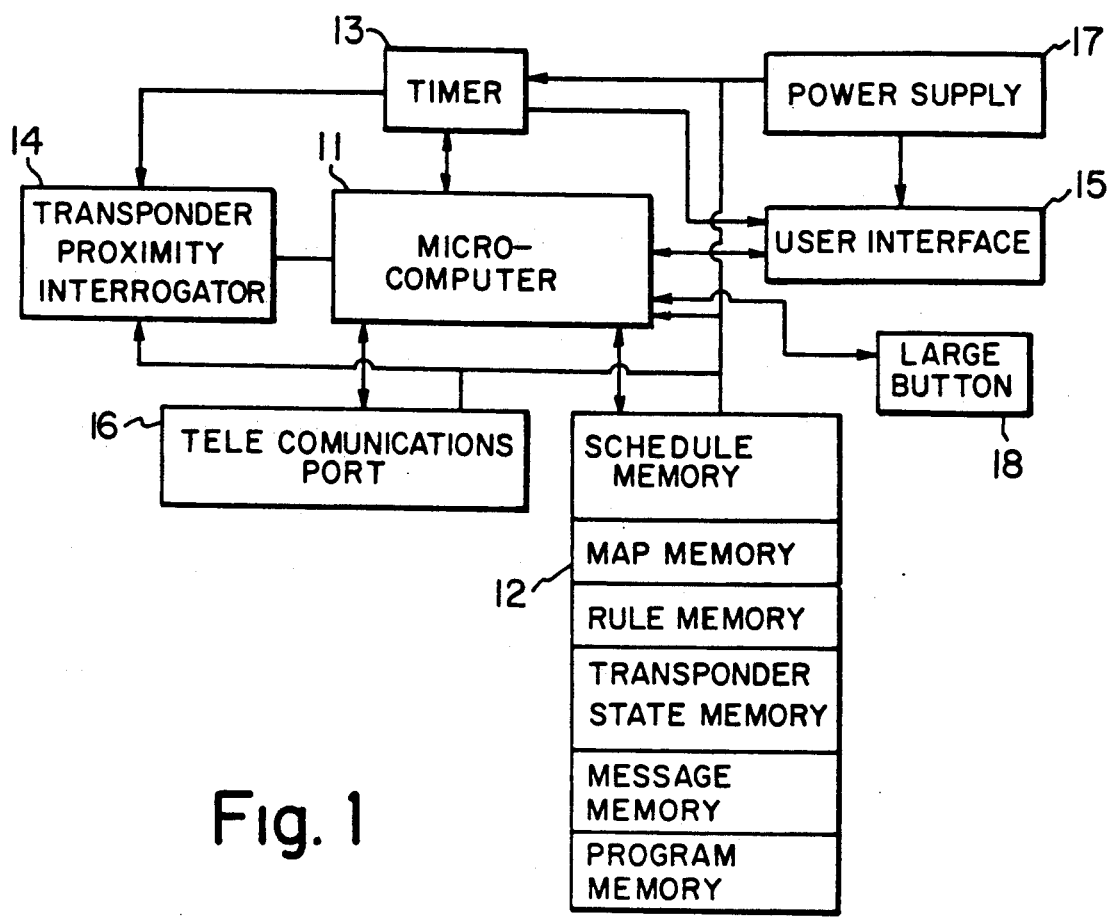
FIG. 1 is a schematic drawing illustrating the hardware organization of a training aid according to this invention.

The preferred embodiments of this invention are implemented with solid state electronics and programmed microcomputer hardware. Since the training aid must be portable for maximum use, it is implemented with microcomputer technology very similar to that used in the manufacture of ordinary hand calculators. Referring to FIG. 1, central to the training aid hardware is a programmable microcomputer comprising a general purpose microprocessor 11 with associated memory 12 for storing a computer program and holding data. A battery power supply for the microcomputer and all the associated hardware is shown at 17. The memory may be divided into segments for holding different types of programs and data. The memory segments comprise program memory, message memory, transponder memory, rule memory, map memory and schedule and tracking memory. The map memory contains data associating task areas with one of more remote transceiver modules, for example. The schedule memory is a list of tasks to be performed in a given order with associated task areas and flags or pointers indicating whether or not at least some of the tasks have been completed. It may also be used to record a history of the trainees performance on a particular day. The rule memory holds a description of special conditions to be met before and during a particular task and points to messages to be given to the trainee doing a particular task. The messages are stored in message memory. These various memories can be combined into fewer segments if desirable.

A programmable timer 13 for keeping track of the elapsed time and/or the time of day is programmed through the microprocessor. The timer may be polled by the microprocessor to determine the time or the timer may interrupt the microprocessor when a preselected time period has run out. The programmable timer may be a separate chip connected by external buses to the microcomputer or it may be part of the same integrated circuit chip as in the case of a microcontroller. Instead of a hardware timer, the timer function may be completely implemented with software in the microprocessor or it may be partially implemented with software in response to interrupts generated by an electronic clock which outputs electrical pulses at uniformly spaced time intervals.

Location detection hardware 14 is connected to the microcomputer through data ports or interrupt ports. This hardware varies with different embodiments. In a preferred embodiment, it will comprise at least one signal transmitter and a plurality of signal receivers. These, in connection with the timer 12, can be used to determine the distance and direction to spaced remote transceiver modules in order to establish the location of the training aid relative to the environment in which it is to be used.

A user interface 15, such as a keypad and liquid crystal display, is connected by a data bus and, perhaps, an interrupt bus to the microprocessor so the user may, for example, supply data to the computer memory or acknowledge messages from the training aid. Since the training aid may be most useful with trainees that by the very nature of their work will have their hands full or by trainees for which reading a display is difficult, it is most preferred that the user interface comprise a computer generated voice output in addition to a graphic visual display.

Since the programming will not usually be performed directly upon the training aid microcomputer but on a host computer having a high level programming environment, a communications port 16 for down loading the training program and data is provided. A great advantage of this invention is remote monitoring of the trainees progress in learning the series of assigned tasks. To this end, the trainee task history may be uploaded through the communications port to a host computer for analysis. This port communicates with the microprocessor through an external data bus or, if the port is integral as in the case of a microcontroller, through an internal data bus. The port may be arranged to temporarily connect directly to a cable from the host computer; it may connect to a modem having a receptacle for receiving a telephone line, or still further, it may comprise a pager/cellular phone interface. In the most practical application of this invention, the training aid is not physically connected to the host computer while the trainee is performing his work. This may require disconnection after programming of the microcomputer.

A task completion input may be required to inform the microcomputer that a particular task has been completed by the trainee. This may be input through the user interface, for example, through the keypad or through a special large push button 18 that connects to the communications port of the microcomputer. In some instances, it may be possible and even necessary to automate the input. An FMR or sonic signal may be emitted by an external device when a task is completed. In this case, the communications port 16 is provided with a receiver to pick up the job completion signal. The receivers of the location detector hardware might even be used to detect the job completion signal.

Figure 2:
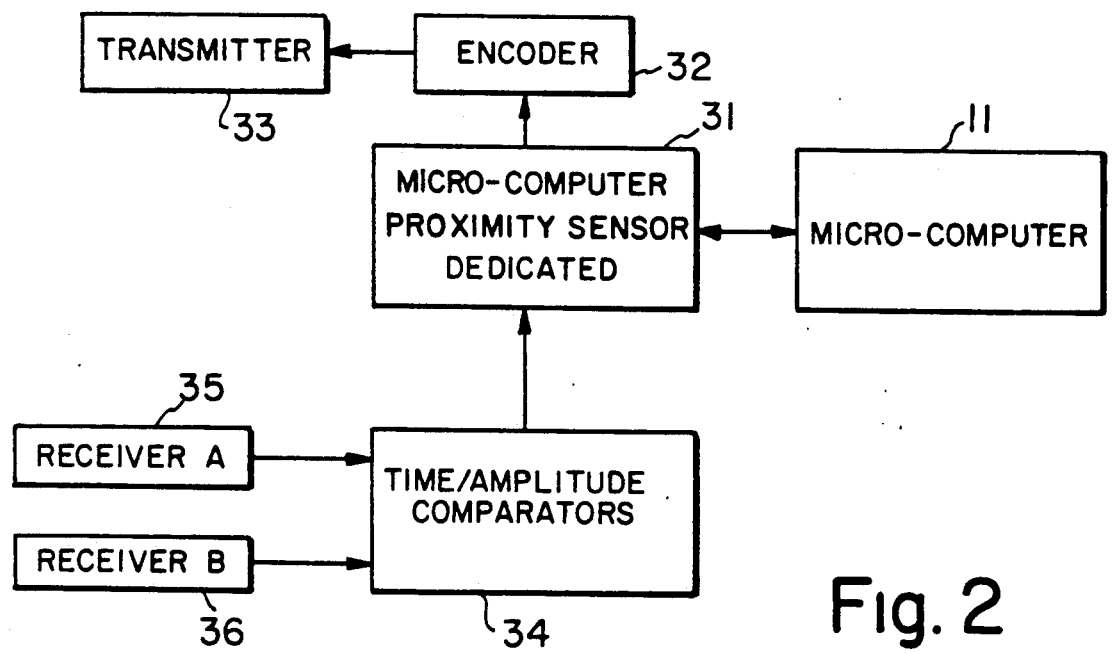
FIG. 2 is a schematic drawing illustrating the organization of one embodiment of a transponder proximity interrogator of FIG. 1.

Referring to FIG. 2, there is shown a schematic of a preferred embodiment of the location detector hardware. The detector has a dedicated microcomputer 31 in communication with the main microprocessor 11. The dedicated microcomputer drives the encoder 32 which in turn controls a transmitter 33 for transmitting request signals. A plurality of receivers 35, 36 for receiving response signals are connected to a timer/amplitude comparator 34 which is read by the dedicated microcomputer 31. The location detector may be substantially as described in my U.S. patent application Ser. No. 07/158,555 filed Feb. 28, 1988 and entitled "Electronic Homing System" which is incorporated herein by reference. In this case, it further comprises a plurality of stand alone remote transceiver modules.

Figure 3:
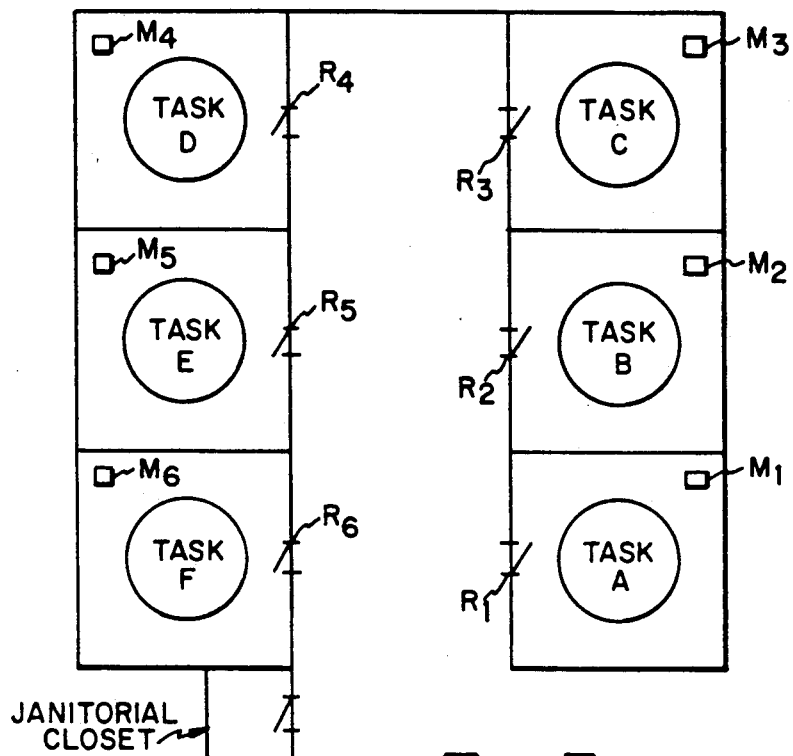
FIG. 3 is a floor plan on which multiple work sites are identified as well as the positioning of remote transceiver modules.

Referring to FIG. 3, a floor plan for a portion of a building having six offices along a hallway connecting the offices and with a janitorial closet at one end of the hall is shown. Assume a trainee is to be taught to collect supplies or a janitorial cart at the closet, move from room to room performing sometimes different tasks in each room and then to return the supplies to the closet. For convenience, the task areas are labeled A to F on the floor plan. In each room, a remote module M1 to M6 is positioned. It may even be desirable to fix a remote module to the movable janitorial cart so that the trainee can be led to find the cart wherever it is located within the building. Repeaters R1 to R6 are placed in each of the doorways. The remote modules comprise means for transmitting an uncoded nondirectional (in other words, omnidirectional) response signal. The remote modules have a selector or tuner such that each is provided a unique signal processing characteristic, for example, the remote modules may be selected to respond to a request signal having a particular pulse train configuration. The location detector of the training aid at spaced intervals transmits coded, nondirectional request signals and receives the response signals from any activated remote module. The dedicated microcomputer generates an internal representation of the distance to the activated remote module from the time measured between the transmission of the request signal and the return of the response signal. The dedicated microcomputer generates a representation of the direction to the activated (responding) remote module by the difference in the time of arrival of the response signal at different receivers. It is assumed that the trainee is in the general vicinity of the task area associated with the nearest responding remote module as provided by the map memory. Typically, if the request signal is EMR, the response signal is sonic and visa versa. The details of this system are set forth in my above-identified application. Other position detecting hardware may be used in the practice of this invention. The location detector is not only used to determine if the trainee is in the correct location to perform a task but also to give directions to the correct location. For example, the direction may be detected by the relative amplitudes of the response signals.

Figure 4:
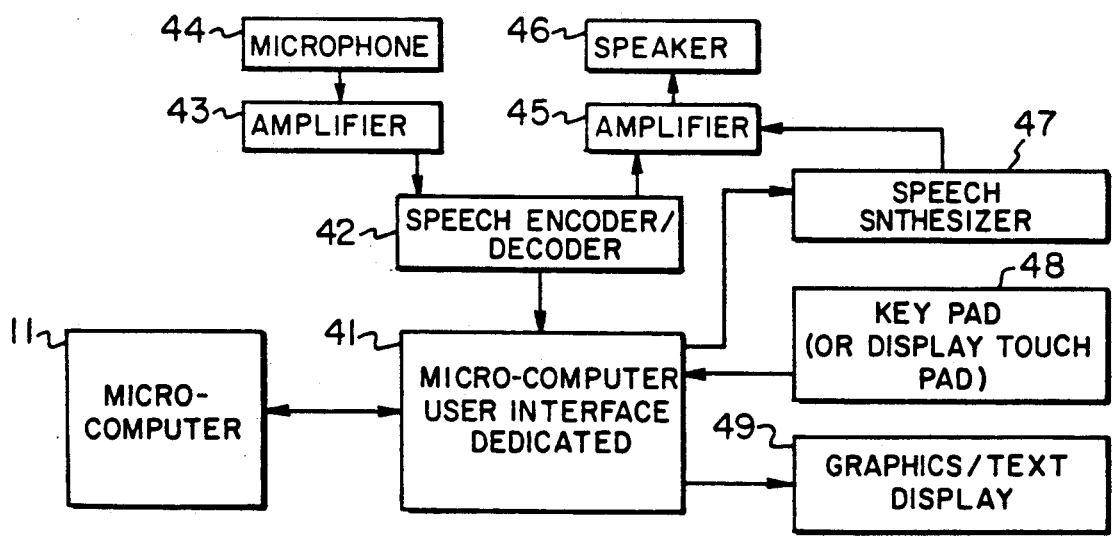
FIG. 4 is a schematic drawing illustrating the organization of one embodiment of a user interface of FIG. 1.

Referring to FIG. 4, a preferred embodiment of the user interface is schematically illustrated. The user interface has a dedicated microcomputer 41, in communication with the main microprocessor 11. The dedicated microcomputer receives input from a keypad or display touch pad 48 and provides output to some type of visual display such as a liquid crystal graphics/text display. Since trainees may well have both memory and cognitive deficiencies, it is most preferred that the user interface provide for speech input and output. Thus, the user interface dedicated microcomputer communicates with a speech encoder/decoder 42 which in turn is connected to a microphone 44 through an audio amplifier 43 and a speaker 46 through an audio amplifier 45. A speech synthesizer 47 is connected between the microcomputer 41 and the amplifier 45.

Figure 5:
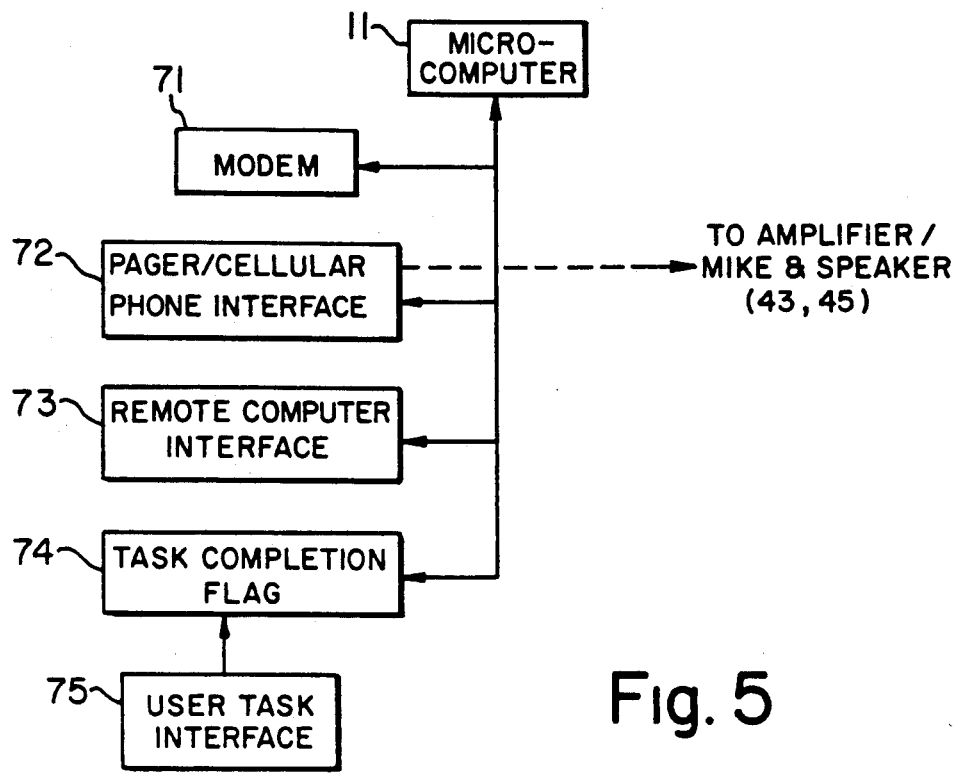
FIG. 5 is a schematic drawing illustrating the organization of one embodiment of a communications port of FIG. 1.

FIG. 5 is a schematic illustration relating to a preferred embodiment of the communications port. This port connects directly to the main microprocessor and may comprise a modem 71, a pager/cellular phone interface which may also be connected to the amplifiers for the microphone and speaker shown in FIG. 4. Almost surely, the port will comprise a remote computer interface 73 and a user task interface 75 which may simply be a push button but may comprise a more complex input such as a sonic input or EMR input. The user task interface will normally have a hardware buffer 75 for capturing and holding the status of the history of the push button.

Figure 6:
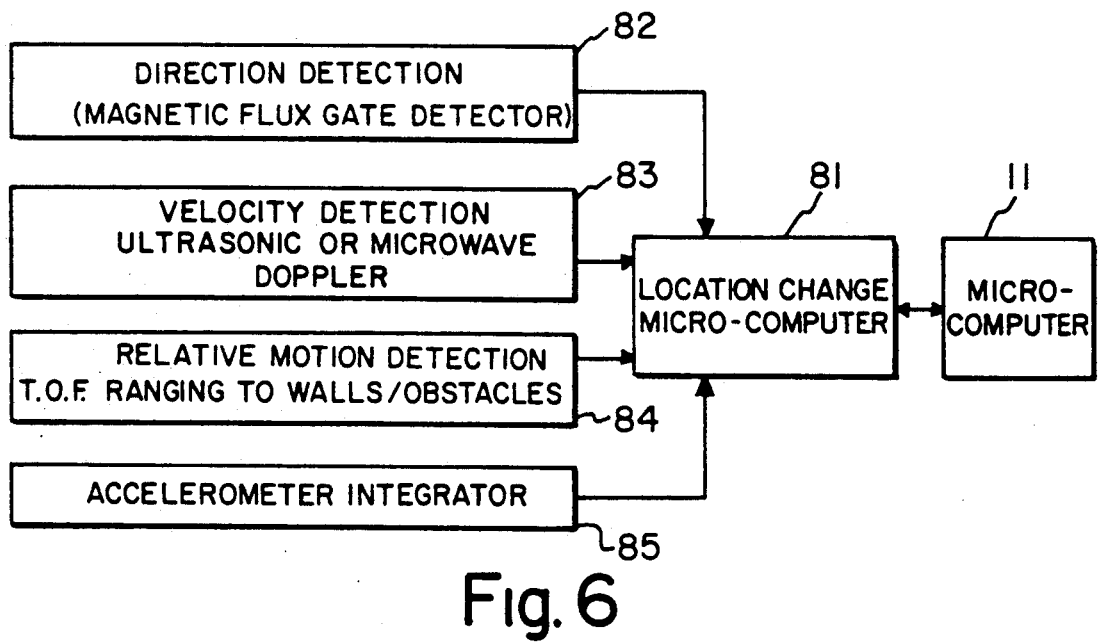
FIG. 6 is a schematic drawing illustrating the organization of one embodiment of an optional direction/velocity system useful with the system of FIG. 1.

In some instances, it may be very useful to know the direction and speed of movement of the trainee at a task location or between task locations. FIG. 6 illustrates schematically a location change circuit comprising a dedicated location change microcomputer 81 in communication with the main microprocessor 11. The microcomputer is connected to one or more transducers that provide a signal indicative of direction and/or velocity. The direction detection transducer 82 may comprise a magnetic flux gate detector. The velocity transducer 83 may comprise an ultrasonic or microwave Doppler effect transducer. Relative motion detection may be detected by a transducer 84 that uses time of flight ranging to nearby walls and obstacles. Velocity and distance can be detected by an integrating accelerometer 85.

Figure 7:
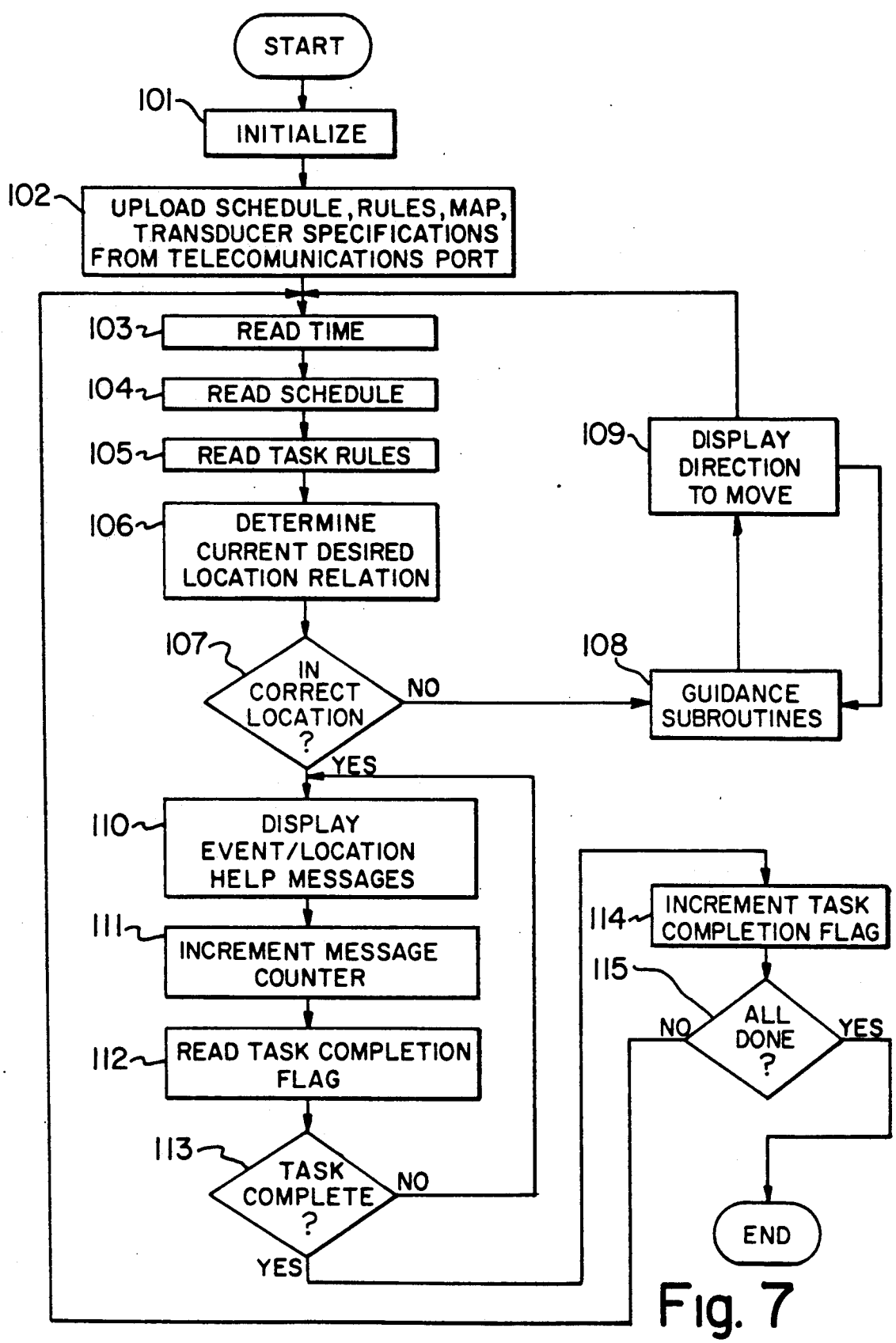
FIG. 7 is a flow diagram describing one embodiment of a software program for controlling and defining the training aid according to this invention.

As with any computer implemented device, the software for controlling the computer device defines a large portion of its functionality and operation. Referring to FIG. 7, there is shown a flow diagram for a typical software program for a training device according to this invention. At block 101, which is automatically implemented on start-up, the system is initialized. This comprises setting ports and timers and clearing memory, for example. The time of day is read and set, for example, by prompting the user to make an entry through the keypad or by interrogating the host computer through the communications port before it is disconnected. At block 102, the programs and data are uploaded from the host computer. This will include loading data defining the work schedule for the trainee, messages to provide cues and instruction, a map or some other spacial representation of the work area and the specification of various transducers.

The structure of the data might be as set forth in the following Tables I and II showing a portion of a schedule memory and message memory, respectively. These are related to FIG. 3 showing a floor plan of a building in which the trainee is to perform his tasks.

TABLE I

| | | Schedule Memory | | | |
|---|---|---|---|---|---|
| Task | Room | Task Description | Message Pointer | Done Flag | Normal Time To Complete |
| A | M1 | Move to A | 1 | done | 5 |
| B | M1 | Carpets | 2 | | 5 |
| C | M1 | Wastebaskets | — | done | 5 |
| D | M2 | Move to B | 3 | done | 5 |
| E | M2 | Wastebaskets | 4 | done | 5 |

TABLE II

| | Message Memory |
|---|---|
| Message No. | Message |
| 1 | "Go to Room A and acknowledge arrival" |
| 2 | "Sweep carpets and empty wastebaskets" |
| 3 | "Move to Room B and acknowledge arrival" |
| 4 | "Empty wastebaskets" |

At this point, a repeating loop is entered. The time is read at block 103 by reading the timer 13. The trainee's work schedule which is stored in memory is referenced at block 104 to determine what task is required at the time determined at 103. Reference is then made to the task rules at block 105 to determine the location at which the current task is to be performed. At block 106, reference is made to the location detection hardware for comparison of the current actual location to the currently desired location as earlier determined by reference to the task rules.

At decision block 107, if the training aid is not at the correct location, the program flow is to a guidance subroutine which guides the trainee to the proper location through outputs to the user interface display or through computer voice output at block 109. Once the trainee has arrived at the correct location, the loop comprising blocks 103 to 106 is reentered. If at the decision block 107 the trainee is in the correct location, program flow is to block 110 at which a message is output to the trainee instructing him to perform at least one task at that location. It may instruct the performance of several tasks at the given location and then instruct the trainee to move to the next location. At block 111, the message counter is incremented. At 112, reference is made to the task completion flag. The task completion flag is toggled on by the task completion input, say button 108 pushed by the trainee when the task has been competed. At decision block 113, computer flow is returned to the loop comprising blocks 110 to 112 if the task completion flag is not set. If the task completion flag is set, the flag is reset at block 114 and flow is returned to the loop comprising blocks 103 to 106.

The subroutine for guiding the trainee to the next task area is explained with reference to FIG. 8. The subroutine is entered at 501. At block 502 the timer is started. At block 503 a coded transmission selective of the area to which the trainee is being directed, or else an intermediated area, is commanded. After waiting for the return signal at block 504, the times and/or amplitudes of the response signal at all sensors are stored at block 505. At block 506, a nearer-farther subroutine is called which determines if, since the last poll of the selected remote module, the trainee has moved closer to the target location or away from that location. At block 507, a direction subroutine is called to point the trainee in the correct direction. The direction to the requested module is determined by the difference in times of arrival of the response signals or the difference in amplitude of the response signals at the various receivers on the training aid. The direction subroutine is explained hereafter with reference to FIG. 9. At decision block 508, if the distance to the requested module is within a preset limit, then either it is assumed that the trainee has reached his next work area or an intermediate work area and program flow is returned to the calling program. If not and an expected amount of time to make the trip has elapsed as determined at decision block 509, program flow loops back through blocks 502 and 508. If more than the expected time has passed, flow returns to the calling program.

Referring to FIG. 9, the first step of the direction subroutine is to calculate the difference in arrival times of the response signals at block 601. Next or alternatively at 602, the differences in amplitudes of the response signals are calculated. Based upon these calculations at block 603, the direction of the responding remote module is determined relative to the position of the training aid which is normally going to be mounted on the trainees belt in the front of his torso. Finally, an output to the trainee in the nature of a directional/display arrow or a voice command is given at block 604 and program flow is returned to the calling program.

Having thus described my invention with the details and particularity required by the Patent Laws, what is claimed and desired to be protected by Letters Patent is set forth in the following claims.

What is claimed:

1. A system for training or aiding an individual to perform a series of tasks at spaced work sites comprising:
   a mobile device for being worn or carried by the individual comprising:
   a means for detecting the position of the mobile device relative to the spaced work sites,
   programmed computer means comprising:
   means for storing a data structure associating each task with the ordinal number of the task, a task description, the site at which the task is to be performed, a flag or pointer indicative of whether a task has been performed and messages containing cues and/or instructions for each task,
   means for storing and executing a program which based upon the task flag or pointer and the location of the mobile module read from the position detecting means determines if the individual is at the correct site and for instructing him so if the case may be and if the individual is at the correct site cueing or instructing the individual to perform a task.

2. The system according to claim 1 wherein the mobile module further comprises a clock means which is repeatedly read and the stored program determines whether the individual is at the correct site based upon the time of day.

3. The system according to claim 1 wherein the mobile module further comprises a clock means which is repeatedly read and a stored program that determines whether the individual is at the correct site based upon the length of time that has elapsed since a previously given cue and/or instruction.

4. The system according to claim 1 wherein if the individual is not at the correct site the programmed computer outputs a message to the individual instructing him to move to the correct site.

5. The system according to claim 4 wherein the individual the programmed computer outputs messages guiding the individual to the correct site.

6. The system according to claim 1 wherein the programmed computer means has a communications port for down loading data structures defining work schedules for the individual and for up loading work histories.

7. The system according to claim 3 wherein with the failure of the individual to arrive at a correct site within a prescribed time the programmed computer causes an alarm to be automatically triggered to alert supervisory personnel.

8. The system according to claim 1 wherein the mobile device has a means to enable the individual to acknowledge completion of a task.

9. The system according to claim 3 wherein the mobile device has a means to enable the individual to acknowledge completion of a task.

10. The system according to claim 9 wherein upon failure of the individual to acknowledge completion of a task within a prescribed time the programmed computer automatically triggers an alarm to alert supervisory personnel.

11. The system for training or aiding a memory impaired individual to perform a series of tasks at spaced work sites comprising:
    a plurality of transceiver devices for being positioned relative to sites where tasks are to be performed,
    a mobile device for being worn or carried by the individual comprising:
    means for detecting the position of the mobile device relative to the transceiver devices,
    clock means,
    program computer means comprising:
    means for repeatedly reading the clock means and position detecting means,
    means for storing a data structure associating each task with the ordinal number of the task, a task description, the site at which the task is to be performed, a time for performance of the task and a flag or pointer indicative of whether the task has been performed and messages containing cues and/or instructions for each task, means for storing and executing a program which based upon the task flag or pointer, the location of the mobile module read from the task position detecting means, and the time read from the clock means determines if the individual is at the correct site and for instructing him so if the case may be and if the individual is at the correct site cueing or instructing the individual to perform a task.

* * * * *

UNITED STATES PATENT AND TRADEMARK OFFICE
CERTIFICATE OF CORRECTION

PATENT NO. : 5,032,083
DATED : July 16, 1991
INVENTOR(S) : Mark B. Friedman

It is certified that error appears in the above-identified patent and that said Letters Patent is hereby corrected as shown below:

Column 5 Line 14 "visa" should read --vice--.

Column 7 Lines 13-14 "intermediated" should read --intermediate--.

Claim 5 Lines 25-26 Column 8 after "wherein" delete --the individual--.

Signed and Sealed this

Tenth Day of November, 1992

*Attest:*

DOUGLAS B. COMER

*Attesting Officer*  *Acting Commissioner of Patents and Trademarks*